(12) United States Patent
Kiester et al.

(10) Patent No.: US 9,238,488 B2
(45) Date of Patent: Jan. 19, 2016

(54) ELASTICALLY AVERAGED ALIGNMENT SYSTEMS AND METHODS

(71) Applicant: GM GLOBAL TECHNOLOGY OPERATIONS LLC, Detroit, MI (US)

(72) Inventors: Timothy A. Kiester, Royal Oak, MI (US); Steven E. Morris, Fair Haven, MI (US); Kenton L. West, Orion, MI (US); Scott J. Fast, Macomb, MI (US); Evan Phillips, Chelsea, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 14/136,502

(22) Filed: Dec. 20, 2013

(65) Prior Publication Data
US 2015/0175219 A1 Jun. 25, 2015

(51) Int. Cl.
*B62D 27/00* (2006.01)
*B62D 27/04* (2006.01)
(Continued)

(52) U.S. Cl.
CPC ............... *B62D 27/04* (2013.01); *B62D 27/06* (2013.01); *B21D 53/88* (2013.01); *H01M 10/02* (2013.01); *Y10T 29/49826* (2015.01); *Y10T 403/1624* (2015.01)

(58) Field of Classification Search
CPC ........ B21D 53/88; H01M 10/02; B62D 27/04
USPC ......... 296/187.01, 24.34, 29, 191; 248/311.2; 267/153; 403/14, 280, 282, 408.1; 29/428, 450, 525.05, 525.01
See application file for complete search history.

(56) References Cited

U.S. PATENT DOCUMENTS 1,219,398 A 3/1917 Huntsman
1,261,036 A 4/1918 Kerns
(Continued)

FOREIGN PATENT DOCUMENTS

CN 1036250 A 10/1989
CN 1129162 A 8/1996
(Continued)

OTHER PUBLICATIONS

"Elastic Averaging in Flexture Mechanisms: A Multi-Beam Paralleaogram Flexture Case-Study" by Shorya Awtar and Edip Sevincer, Proceedings of IDETC/CIE 2006, Paper DETC2006-99752, American Society of Mechanical Engineers (ASME), Sep. 2006.
(Continued)

*Primary Examiner* — Joseph D Pape
*Assistant Examiner* — Dana Ivey
(74) *Attorney, Agent, or Firm* — Cantor Colburn LLP

(57) ABSTRACT

In one aspect, an elastically averaged alignment system is provided. The system includes a first component including an alignment member, the alignment member including a base portion extending from an edge of the first component, and a connector portion coupled to the base portion. The system also includes a second component including a receiving member. The receiving member includes a pair of cantilever members extending from an edge of the second component and defines a receiving aperture configured to receive at least a portion of the alignment member to couple the first component and the second component. The alignment member is an elastically deformable material such that when the alignment member is inserted into the receiving aperture, the alignment member elastically deforms to an elastically averaged final configuration to facilitate aligning the first component edge relative to the second component edge.

17 Claims, 5 Drawing Sheets

(51) Int. Cl.
   *B62D 27/06*   (2006.01)
   *B21D 53/88*   (2006.01)
   *H01M 10/02*   (2006.01)

(56) References Cited

U.S. PATENT DOCUMENTS

| | | |
|---|---|---|
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,482,488 A | 9/1949 | Franc |
| 2,612,139 A | 9/1952 | Collins |
| 2,688,894 A | 9/1954 | Modrey |
| 2,707,607 A | 5/1955 | O'Connor |
| 2,778,399 A | 1/1957 | Mroz |
| 2,780,128 A | 2/1957 | Rapata |
| 2,862,040 A | 11/1958 | Curran |
| 2,902,902 A | 9/1959 | Slone |
| 2,946,612 A | 7/1960 | Ahlgren |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,643,968 A | 2/1972 | Horvath |
| 3,680,272 A | 8/1972 | Meyer |
| 3,842,565 A | 10/1974 | Brown et al. |
| 3,845,961 A | 11/1974 | Byrd, III |
| 3,847,492 A | 11/1974 | Kennicutt et al. |
| 3,895,408 A | 7/1975 | Leingang |
| 3,905,570 A | 9/1975 | Nieuwveld |
| 3,972,550 A | 8/1976 | Boughton |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,213,675 A | 7/1980 | Pilhall |
| 4,237,573 A | 12/1980 | Weihrauch |
| 4,300,851 A | 11/1981 | Thelander |
| 4,313,609 A | 2/1982 | Clements |
| 4,318,208 A | 3/1982 | Borja |
| 4,325,574 A | 4/1982 | Umemoto et al. |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,477,142 A | 10/1984 | Cooper |
| 4,481,160 A | 11/1984 | Bree |
| 4,575,060 A | 3/1986 | Kitagawa |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,745,656 A | 5/1988 | Revlett |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,881,764 A | 11/1989 | Takahashi et al. |
| 4,973,212 A | 11/1990 | Jacobs |
| 4,977,648 A | 12/1990 | Eckerud |
| 5,139,285 A | 8/1992 | Lasinski |
| 5,154,479 A | 10/1992 | Sautter, Jr. |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,297,322 A | 3/1994 | Kraus |
| 5,342,139 A | 8/1994 | Hoffman |
| 5,368,797 A | 11/1994 | Quentin et al. |
| 5,397,206 A | 3/1995 | Sihon |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,575,601 A | 11/1996 | Skufca |
| 5,577,301 A | 11/1996 | DeMaagd |
| 5,577,779 A | 11/1996 | Dangel |
| 5,580,204 A | 12/1996 | Hultman |
| 5,586,372 A | 12/1996 | Eguchi et al. |
| 5,601,453 A | 2/1997 | Horchler |
| 5,634,757 A | 6/1997 | Schanz |
| 5,657,516 A | 8/1997 | Berg et al. |
| 5,667,271 A | 9/1997 | Booth |
| 5,670,013 A | 9/1997 | Huang et al. |
| 5,698,276 A | 12/1997 | Mirabitur |
| 5,736,221 A | 4/1998 | Hardigg et al. |
| 5,765,942 A | 6/1998 | Shirai et al. |
| 5,795,118 A | 8/1998 | Osada et al. |
| 5,797,170 A | 8/1998 | Akeno |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,941,673 A | 8/1999 | Hayakawa et al. |
| 6,073,315 A | 6/2000 | Rasmussen |
| 6,095,594 A | 8/2000 | Riddle et al. |
| 6,164,603 A | 12/2000 | Kawai |
| 6,193,430 B1 | 2/2001 | Culpepper et al. |
| 6,202,962 B1 | 3/2001 | Snyder |
| 6,209,175 B1 | 4/2001 | Gershenson |
| 6,209,178 B1 | 4/2001 | Wiese et al. |
| 6,264,869 B1 | 7/2001 | Notarpietro et al. |
| 6,299,478 B1 | 10/2001 | Jones et al. |
| 6,321,495 B1 | 11/2001 | Oami |
| 6,349,904 B1 | 2/2002 | Polad |
| 6,354,815 B1 | 3/2002 | Svihla et al. |
| 6,378,931 B1 | 4/2002 | Kolluri et al. |
| 6,398,449 B1 | 6/2002 | Loh |
| 6,484,370 B2 | 11/2002 | Kanie et al. |
| 6,485,241 B1 | 11/2002 | Oxford |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,658,698 B2 | 12/2003 | Chen |
| 6,662,411 B2 | 12/2003 | Rubenstein |
| 6,664,470 B2 | 12/2003 | Nagamoto |
| 6,677,065 B2 | 1/2004 | Blauer |
| 6,692,016 B2 | 2/2004 | Yokota |

(56) References Cited

U.S. PATENT DOCUMENTS

| | | |
|---|---|---|
| 6,712,329 B2 | 3/2004 | Ishigami et al. |
| 6,746,172 B2 | 6/2004 | Culpepper |
| 6,799,758 B2 | 10/2004 | Fries |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,234,852 B2 | 6/2007 | Nishizawa et al. |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 * | 11/2008 | Yi et al. .......................... 385/52 |
| 7,487,884 B2 | 2/2009 | Kim |
| 7,493,716 B2 | 2/2009 | Brown |
| 7,557,051 B2 | 7/2009 | Ryu et al. |
| 7,568,316 B2 | 8/2009 | Choby et al. |
| D602,349 S | 10/2009 | Andersson |
| 7,672,126 B2 | 3/2010 | Yeh |
| 7,677,650 B2 | 3/2010 | Huttenlocher |
| 7,764,853 B2 | 7/2010 | Yi et al. |
| 7,793,998 B2 | 9/2010 | Matsui et al. |
| 7,802,831 B2 | 9/2010 | Isayama et al. |
| 7,828,372 B2 | 11/2010 | Ellison |
| 7,862,272 B2 | 1/2011 | Nakajima |
| 7,869,003 B2 | 1/2011 | Van Doren et al. |
| 7,883,137 B2 | 2/2011 | Bar |
| 7,922,415 B2 | 4/2011 | Rudduck et al. |
| 7,946,684 B2 | 5/2011 | Drury et al. |
| 2,001,239 A1 | 10/2011 | Huang |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,261,581 B2 | 9/2012 | Cerruti et al. |
| 8,276,961 B2 | 10/2012 | Kwolek |
| 8,297,137 B2 | 10/2012 | Dole |
| 8,297,661 B2 | 10/2012 | Proulx et al. |
| 8,414,048 B1 | 4/2013 | Kwolek |
| 8,444,199 B2 | 5/2013 | Takeuchi et al. |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,826,499 B2 | 9/2014 | Tempesta |
| 8,833,832 B2 | 9/2014 | Whipps |
| 8,834,058 B2 | 9/2014 | Woicke |
| 9,039,318 B2 | 5/2015 | Mantei et al. |
| 9,050,690 B2 | 6/2015 | Hammer et al. |
| 9,061,715 B2 | 6/2015 | Morris |
| 9,067,625 B2 | 6/2015 | Morris |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0136617 A1 | 9/2002 | Imahigashi |
| 2003/0007831 A1 | 1/2003 | Lian et al. |
| 2003/0080131 A1 | 5/2003 | Fukuo |
| 2003/0082986 A1 | 5/2003 | Wiens et al. |
| 2003/0087047 A1 | 5/2003 | Blauer |
| 2003/0108401 A1 | 6/2003 | Agha et al. |
| 2003/0180122 A1 | 9/2003 | Dobson |
| 2004/0037637 A1 | 2/2004 | Lian et al. |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2005/0016116 A1 | 1/2005 | Scherff |
| 2005/0031946 A1 | 2/2005 | Kruger et al. |
| 2005/0054229 A1 | 3/2005 | Tsuya |
| 2005/0082449 A1 | 4/2005 | Kawaguchi et al. |
| 2005/0156409 A1 | 7/2005 | Yokota |
| 2005/0156410 A1 | 7/2005 | Yokota |
| 2005/0156416 A1 | 7/2005 | Yokota |
| 2005/0244250 A1 | 11/2005 | Okada et al. |
| 2006/0102214 A1 | 5/2006 | Clemons |
| 2006/0110109 A1 | 5/2006 | Yi |
| 2006/0113755 A1 | 6/2006 | Yokota |
| 2006/0141318 A1 | 6/2006 | MacKinnon et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 * | 11/2006 | DeMonte ...................... 220/737 |
| 2006/0264076 A1 | 11/2006 | Chen |
| 2007/0040411 A1 | 2/2007 | Dauvergne |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0144659 A1 | 6/2007 | De La Fuente |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0134652 A1 | 5/2009 | Araki |
| 2009/0141449 A1 | 6/2009 | Yeh |
| 2009/0174207 A1 | 7/2009 | Lota |
| 2009/0265896 A1 | 10/2009 | Beak |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0247034 A1 | 9/2010 | Yi et al. |
| 2010/0270745 A1 | 10/2010 | Hurlbert et al. |
| 2011/0012378 A1 | 1/2011 | Ueno et al. |
| 2011/0076588 A1 | 3/2011 | Yamaura |
| 2011/0119875 A1 | 5/2011 | Iwasaki |
| 2011/0131918 A1 | 6/2011 | Glynn |
| 2011/0175376 A1 | 7/2011 | Whitens et al. |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0020726 A1 | 1/2012 | Jan |
| 2012/0073094 A1 | 3/2012 | Bishop |
| 2012/0115010 A1 | 5/2012 | Smith et al. |
| 2012/0240363 A1 | 9/2012 | Lee |
| 2012/0251226 A1 | 10/2012 | Liu et al. |

(56) References Cited

U.S. PATENT DOCUMENTS

| | | |
|---|---|---|
| 2012/0261951 A1 | 10/2012 | Mildner et al. |
| 2012/0321379 A1 | 12/2012 | Wang et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0157578 A1 | 6/2014 | Morris et al. |
| 2014/0159412 A1 | 6/2014 | Morris et al. |
| 2014/0175774 A1 | 6/2014 | Kansteiner |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0050068 A1 | 2/2015 | Morris et al. |
| 2015/0069779 A1 | 3/2015 | Morris et al. |
| 2015/0078805 A1 | 3/2015 | Morris et al. |

FOREIGN PATENT DOCUMENTS

| | | |
|---|---|---|
| CN | 1205285 A | 1/1999 |
| CN | 1328521 A | 12/2001 |
| CN | 1426872 A | 7/2003 |
| CN | 2661972 Y | 12/2004 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2888807 Y | 4/2007 |
| CN | 2915389 Y | 6/2007 |
| CN | 101250964 A | 4/2008 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 201703439 U | 1/2011 |
| CN | 201737062 U | 2/2011 |
| CN | 201792722 U | 4/2011 |
| CN | 201890285 U | 7/2011 |
| CN | 102144102 A | 8/2011 |
| CN | 202079532 U | 12/2011 |
| CN | 102313952 A | 1/2012 |
| CN | 102756633 | 10/2012 |
| CN | 202686206 U | 1/2013 |
| DE | 1220673 B | 7/1966 |
| DE | 2736012 A1 | 2/1978 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10234253 B3 | 4/2004 |
| DE | 102008005618 A1 | 7/2009 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 1132263 A1 | 9/2001 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2958696 A1 | 10/2011 |
| GB | 2281950 A | 3/1995 |
| JP | 2001171554 A | 6/2001 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| WO | 2008140659 A1 | 11/2008 |
| WO | 2013191622 A1 | 12/2013 |

OTHER PUBLICATIONS

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

"Passive Alignment of Micro-Fluidic Chips Using the Principle of Elastic Averaging" by Sitanshu Gurung, Thesis, Louisiana State University, Dept. of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.

U.S. Appl. No. 13/330,718, filed Dec. 20, 2011, entitled "Pricisely Locating Components in an Infrared Welded Assembly", inventor: Steven E. Morris.

U.S. Appl. No. 13/459,118, filed Apr. 28, 2012, entitled "Stiffened Multi-Layer Compartment Door Assembly Utilizing Elastic Averaging," inventor: Steven E. Morris.

U.S. Appl. No. 13/567,580, filed Aug. 6, 2012, entitled "Semi-Circular Alignment Features of an Elastic Averaging Alignment system", inventors: Steven E. Morris and Thomas F. Bowles.

U.S. Appl. No. 13/570,959, filed Aug. 9, 2012, entitled "Elastic Cantilever Beam Alignment System for Precisely Aligning Components", inventor: Steven E. Morris.

(56) References Cited

OTHER PUBLICATIONS

U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.
U.S. Appl. No. 13/752,449, filed Jan. 29, 2013, entitled "Elastic Insert Alignment Assembly and Method of Reducing Positional Variation", inventors: Steven E. Morris and Michael D. Richardson.
U.S. Appl. No. 13/755,759, filed Jan. 31, 2013, entitled "Elastic Alignment Assembly for Aligning Mated Components and Method of Reducing Positional Variation", inventors: Joel Colombo, Michael D. Richardson, and Steven E. Morris.
U.S. Appl. No. 13/851,222, filed Mar. 27, 2013, entitled "Elastically Averaged Alignment System", inventors: Joel Colombo and Steven E. Morris.
U.S. Appl. No. 13/855,928, filed Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.
U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.
U.S. Appl. No. 13/856,927, filed Apr. 4, 2013, entitled "Elastic Tubular Attachment Assembly for Mating Components and Method of Mating Components", inventors: Steven E. Morris and Jennifer P. Lawall.
U.S. Appl. No. 13/856,956, filed Apr. 4, 2013, entitled "Elastic Clip Retaining Arrangement and Method of Mating Structures with an Elastic Clip Retaining Arrangement", inventors: Joel Colombo, Steven E. Morris and Jeffrey L. Konchan.
U.S. Appl. No. 13/856,973, filed Apr. 4, 2013, entitled "Elastically Deformable Flange Locator Arrangement and Method of Reducing Positional Variation", inventors: Joel Colombo, Steven E. Morris and Michael D. Richardson.
U.S. Appl. No. 13/858,478, filed Apr. 8, 2013, entitled "Elastic Mating Assembling and Method of Elastically Assembling Matable Components", inventors: Steven E. Morris and Jennifer P. Lawall.
U.S. Appl. No. 13/859,109, filed Apr. 9, 2013, entitled "Elastic Retaining Arrangement for Jointed Components and Method of Reducing a Gap Between Jointed Components," inventors: Steven E. Morris, James M. Kushner, Victoria L. Enyedy, Jennifer P. Lawall, and Piotr J. Ogonek.
U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.
U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.
U.S. Appl. No. 13/917,005, filed Jun. 13, 2013, entitled "Elastic Attachment Assembly and Method of Reducing Positional Variation and Increasing Stiffness," inventors: Steven E. Morris and Jennifer P. Lawall.
U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.
U.S. Appl. No. 13/918,183, filed Jun. 14, 2013, entitled "Elastic Retaining Assembly for Matable Components and Method of Assembling," inventors: Steven E. Morris and Jennifer P. Lawall.
U.S. Appl. No. 13/939,503, filed Jul. 11, 2013, entitled "Elastically Averaged Alignment Systems and Methods," inventor: Joel Colombo.
U.S. Appl. No. 13/940,912, filed Jul. 12, 2013, entitled "Alignment Arrangement for Mated Components and Method", inventors: Steven E. Morris and Jennifer P. Lawall.

U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.
U.S. Appl. No. 13/954,198, filed Jul. 30, 2013, entitled "Elastic Alignment and Retention System and Method," inventors: Steven E. Morris, Edward D. Groninger, and Raymond J. Chess.
U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.
U.S. Appl. No. 13/973,587, filed Aug. 22, 2013, entitled "Elastic Averaging Alignment System and Method," inventors: Steven E. Morris and Jennifer P. Lawall.
U.S. Appl. No. 13/974,729, filed Aug. 23, 2013, entitled "Elastic Averaging Snap Member Aligning and Fastening System", inventors: Steven E. Morris and Jennifer P. Lawall.
U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.
U.S. Appl. No. 14/021,282, filed Sep. 9, 2013, entitled "Elastic Tube Alignment and Fastening System for Providing Precise Alignment and Fastening of Components," inventors: Steven E. Morris and Jennifer P. Lawall.
U.S. Appl. No. 14/031,647, filed Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.
U.S. Appl. No. 14/038,241, filed Sep. 26, 2013, entitled "Serviceable Aligning and Self-Retaining Elastic Arrangement for Mated Components and Method," inventors: Steven E. Morris, Jennifer P. Lawall and Joel Colombo.
U.S. Appl. No. 14/039,614, filed Sep. 27, 2013, entitled "Elastically Averaged Alignment Systems and Methods," inventor: Steven E. Morris.
U.S. Appl. No. 14/044,199, filed Oct. 2, 2013, entitled "Lobular Elastic Tube Alignment and Retention System for Providing Precise Alignment of Components," inventors: Steven E. Morris and Jennifer P. Lawall.
U.S. Appl. No. 14/044,207, filed Oct. 2, 2013, entitled "Elastic Aperture Alignment System for Providing Precise Four-Way Alignment of Components," inventors: Steven E. Morris and Jennifer P. Lawall.
U.S. Appl. No. 14/045,463, filed Oct. 3, 2013, entitled "Elastically Averaged Alignment Systems and Methods," inventors: Steven E. Morris and Jennifer P. Lawall.
U.S. Appl. No. 14/081,361, filed Nov. 15, 2013, entitled "Elastically Deformable Clip and Method," inventors: Steven E. Morris, Jennifer P. Lawall and Jeffrey M. Gace.
U.S. Appl. No. 14/104,321, filed Dec. 12, 2013, entitled "Alignment and Retention System for a Flexible Assembly," inventors: Steven E. Morris and Jennifer P. Lawall.
U.S. Appl. No. 14/104,327, filed Dec. 12, 2013, entitled "Self-Retaining Alignment System for Providing Precise Alignment and Retention of Components," inventors: Steven E. Morris, Jennifer P. Lawall and Toure D. Lee.
U.S. Appl. No. 14/104,333, filed Dec. 12, 2013, entitled "Alignment System for Providing Precise Alignment and Retention of Components of a Sealable Compartment," inventors: Steven E. Morris, Christopher J. Georgi, Jennifer P. Lawall and Gordan N. Noll.
U.S. Appl. No. 14/104,541, filed Dec. 12, 2013, entitled "Alignment and Retention System for Providing Precise Alignment and Retention of Components," inventors: Steven E. Morris and Jennifer P. Lawall.
U.S. Appl. No. 14/104,549, filed Dec. 12, 2013, entitled "Alignment System for Providing Alignment of Components Having Contoured Features," inventors: Steven E. Morris and Jennifer P. Lawall.
U.S. Appl. No. 14/108,921, filed Dec. 17, 2013, entitled "Elastically Averaged Alignment Systems and Methods Thereof," inventors: Steven E. Morris and Jennifer P. Lawall.
U.S. Appl. No. 14/108,931, filed Dec. 17, 2013, entitled "Elastically Averaged Strap Systems and Methods," inventors: Steven E. Morris and Jennifer P. Lawall.

(56) References Cited

OTHER PUBLICATIONS

U.S. Appl. No. 14/109,296, filed Dec. 17, 2013, entitled "Fastener for Operatively Coupling Matable Components," inventors: Steven E. Morris and Jennifer P. Lawall.

U.S. Appl. No. 14/134,622, filed Dec. 19, 2013, entitled "Elastic Averaging Alignment Member," inventors: nventors: Steven E. Morris and Jennifer P. Lawall.

U.S. Appl. No. 14/134,801, filed Dec. 19, 2013, entitled "Elastically Averaged Alignment Systems and Methods," inventors: Steven E. Morris and Jennifer P. Lawall.

U.S. Appl. No. 14/134,844, filed Dec. 19, 2013, entitled "Elastically Deformable Module Installation Assembly," inventors: Steven E. Morris and Jennifer P. Lawall.

U.S. Appl. No. 14/134,888, filed Dec. 19, 2013, entitled "Elastic Retaining Assembly and Methods," inventors: Steven E. Morris and Jennifer P. Lawall.

U.S. Appl. No. 14/136,502, filed Dec. 20, 2013, entitled "Elastically Averaged Alignment Systems and Methods," inventors: Timothy A. Kiester, Steven E. Morris, Kenton L. West, Scott J. Fast, and Evan Phillips.

U.S. Appl. No. 14/151,279, filed Jan. 9, 2014, entitled "Elastically Averaged Alignment Systems and Methods," inventors: Steven E. Morris and Jennifer P. Lawall.

U.S. Appl. No. 14/153,741, filed Jan. 13, 2014, entitled "Elastically Averaged Assembly for Closure Applications," inventors: Steven E. Morris, Jeffrey A. Abell, Jennifer P. Lawall, and Jeffrey L. Konchan.

U.S. Appl. No. 14/180,882, filed Feb. 14, 2014, entitled "Elastic Tube Alignment System for Precisely Locating Components," inventor: Steven E. Morris.

U.S. Appl. No. 14/181,142, filed Feb. 14, 2014, entitled "Elastic Tube Alignment System for Precisely Locating Components," inventor: Steven E. Morris.

U.S. Appl. No. 14/185,422, filed Feb. 20, 2014, entitled "Elastically Averaged Alignment Systems and Methods," inventors: Joel Colombo, Steven E. Morris, Jennifer P. Lawall and Ashish M. Gollapalli.

U.S. Appl. No. 14/185,472, filed Feb. 20, 2014, entitled "Elastically Averaged Alignment Systems and Method," inventors: Steven E. Morris, Jennifer P. Lawall and Kee Hyuk Im.

U.S. Appl. No. 14/231,395, filed Mar. 31, 2014, entitled "Elastically Averaged Alignment Systems and Methods," inventors: Joel Colombo, Steven E. Morris, Jenifer P. Lawall, and Ashish M. Gollapalli.

U.S. Appl. No. 14/249,746, filed Apr. 10, 2014, entitled "Elastically Averaged Alignment Systems and Methods," inventors: Joel Colombo and Catherine A. Ostrander.

U.S. Appl. No. 14/259,747, filed Apr. 23, 2014, entitled "System for Elastically Averaging Assembly of Components," inventors: Steven E. Morris and Jennifer P. Lawall.

Cross-sectional view of a prior art infrared welded assembly of BMW, Munich, Germany. Believed on the market since about Jan. 1, 2010.

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

* cited by examiner

ELASTICALLY AVERAGED ALIGNMENT SYSTEMS AND METHODS

FIELD OF THE INVENTION

The subject invention relates to matable components, and more specifically, to elastically averaged matable components.

BACKGROUND

Components, in particular vehicular components, which are to be mated together in a manufacturing process, are mutually located with respect to each other by alignment features that are oversized holes and/or undersized upstanding bosses. Such alignment features are sized to provide spacing to freely move the components relative to one another to align them without creating an interference therebetween that would hinder the manufacturing process. One such example includes two-way and/or four-way male alignment features, typically upstanding bosses, which are received into corresponding female alignment features, typically apertures in the form of slots or holes. The components are formed with a predetermined clearance between the male alignment features and their respective female alignment features to match anticipated size and positional variation tolerances of the male and female alignment features that result from manufacturing (or fabrication) variances.

As a result, significant positional variation can occur between two mated components having the aforementioned alignment features, which may contribute to the presence of undesirably large variation in their alignment, particularly with regard to gaps and/or spacing therebetween. In the case where misaligned components are also part of another assembly, such misalignments may also affect the function and/or aesthetic appearance of the entire assembly. Regardless of whether such misalignment is limited to two components or an entire assembly, it can negatively affect function and result in a perception of poor quality. Moreover, clearance between misaligned components may lead to relative motion therebetween, which may cause undesirable noise such as squeaking and rattling.

SUMMARY OF THE INVENTION

In one aspect, an elastically averaged alignment system is provided. The system includes a first component including an alignment member, the alignment member including a base portion extending from an edge of the first component, and a connector portion coupled to the base portion. The system also includes a second component including a receiving member. The receiving member includes a pair of cantilever members extending from an edge of the second component and defines a receiving aperture configured to receive at least a portion of the alignment member to couple the first component and the second component. The alignment member is an elastically deformable material such that when the alignment member is inserted into the receiving aperture, the alignment member elastically deforms to an elastically averaged final configuration to facilitate aligning the first component edge relative to the second component edge.

In another aspect, a vehicle is provided. The vehicle includes a body and an elastically averaged alignment system integrally arranged within the body. The elastically averaged alignment system includes a first component including an alignment member, the alignment member including a base portion extending from an edge of the first component, and a connector portion coupled to the base portion. The system also includes a second component including a receiving member. The receiving member includes a pair of cantilever members extending from an edge of the second component and defines a receiving aperture configured to receive at least a portion of the alignment member to couple the first component and the second component. The alignment member is an elastically deformable material such that when the alignment member is inserted into the receiving aperture, the alignment member elastically deforms to an elastically averaged final configuration to facilitate aligning the first component edge relative to the second component edge.

In yet another aspect, a method of manufacturing an elastically averaged alignment system is provided. The method includes forming a first component comprising an alignment member, the alignment member comprising a base portion extending from an edge of the first component, and a connector portion coupled to the base portion. The method further includes forming a second component comprising a receiving member, the receiving member comprising a pair of cantilever members extending from an edge of the second component and defining a receiving aperture configured to receive at least a portion of the alignment member to couple the first component and the second component. The method also includes forming the alignment member from an elastically deformable material such that when the alignment member is inserted into the receiving aperture, the alignment member deforms to an elastically averaged final configuration to facilitate aligning the first component edge relative to the second component edge.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
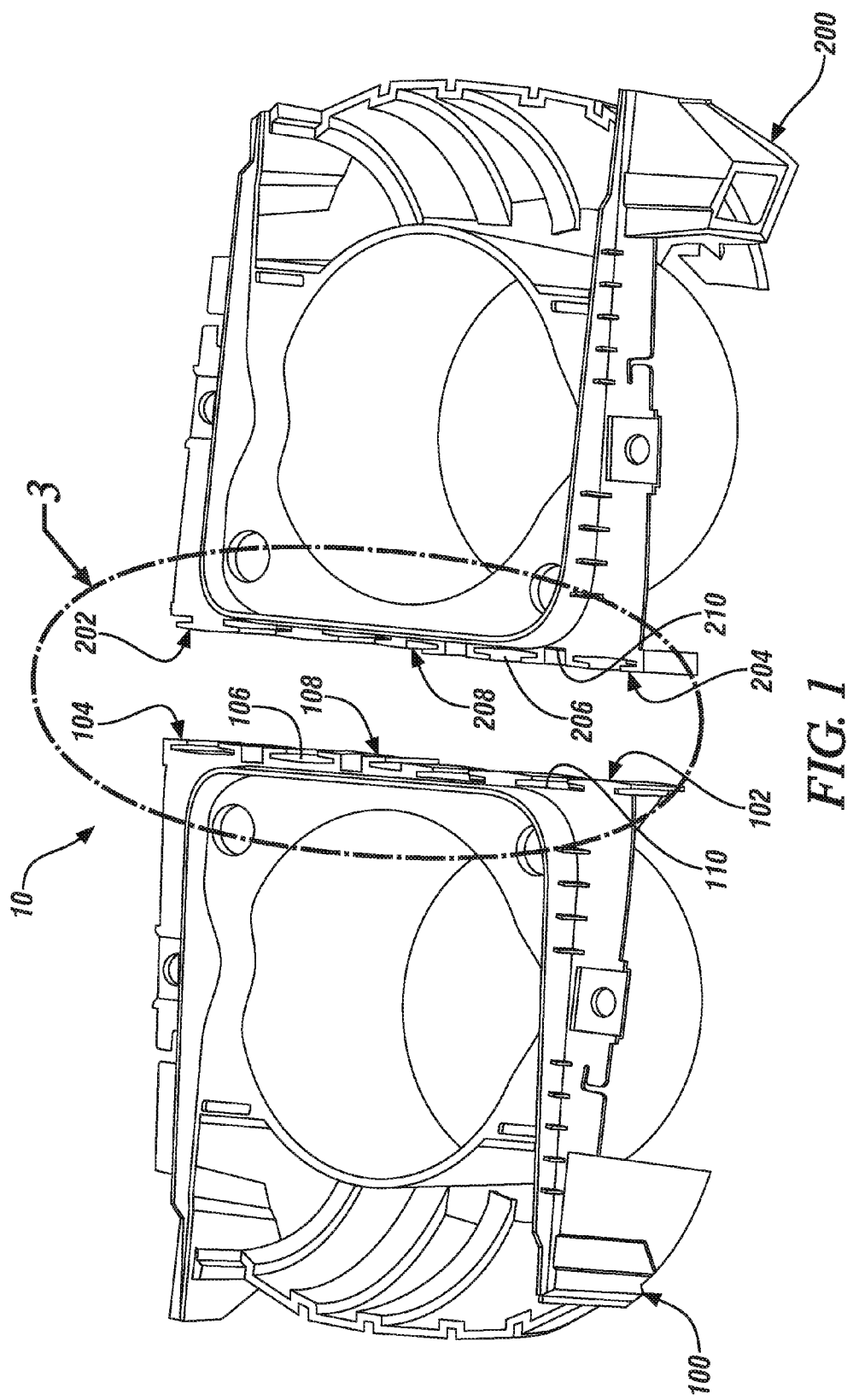
FIG. 1 is a perspective view of an exemplary elastically averaged alignment system before assembly.

The following description is merely exemplary in nature and is not intended to limit the present disclosure, its application or uses. For example, the embodiments shown are applicable to vehicle body panels, but the alignment system disclosed herein may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, published as U.S. Pub. No. 2013/0019455, the disclosure of which is incorporated by reference herein in its entirety. The embodiments disclosed above provide the ability to convert an existing component that is not compatible with the above-described elastic averaging principles, or that would be further aided with the inclusion of a four-way elastic averaging system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

Described herein are elastically averaged alignment systems and methods for matable assemblies. The alignment systems include specially shaped alignment members and corresponding receiving members to facilitate precise orientation between two or more components of the matable assemblies. The alignment systems optionally include additional alignment and receiving members, for example center alignment members, which further facilitate component alignment. Moreover, each component of the matable assemblies may be substantially identical, thereby facilitating a modular production and assembly thereof. As such, the alignment systems limit or prevent movement which can cause misalignment between two or more matable components and maintain a proper coupling between and desired orientation of two or more components.

Figure 2:
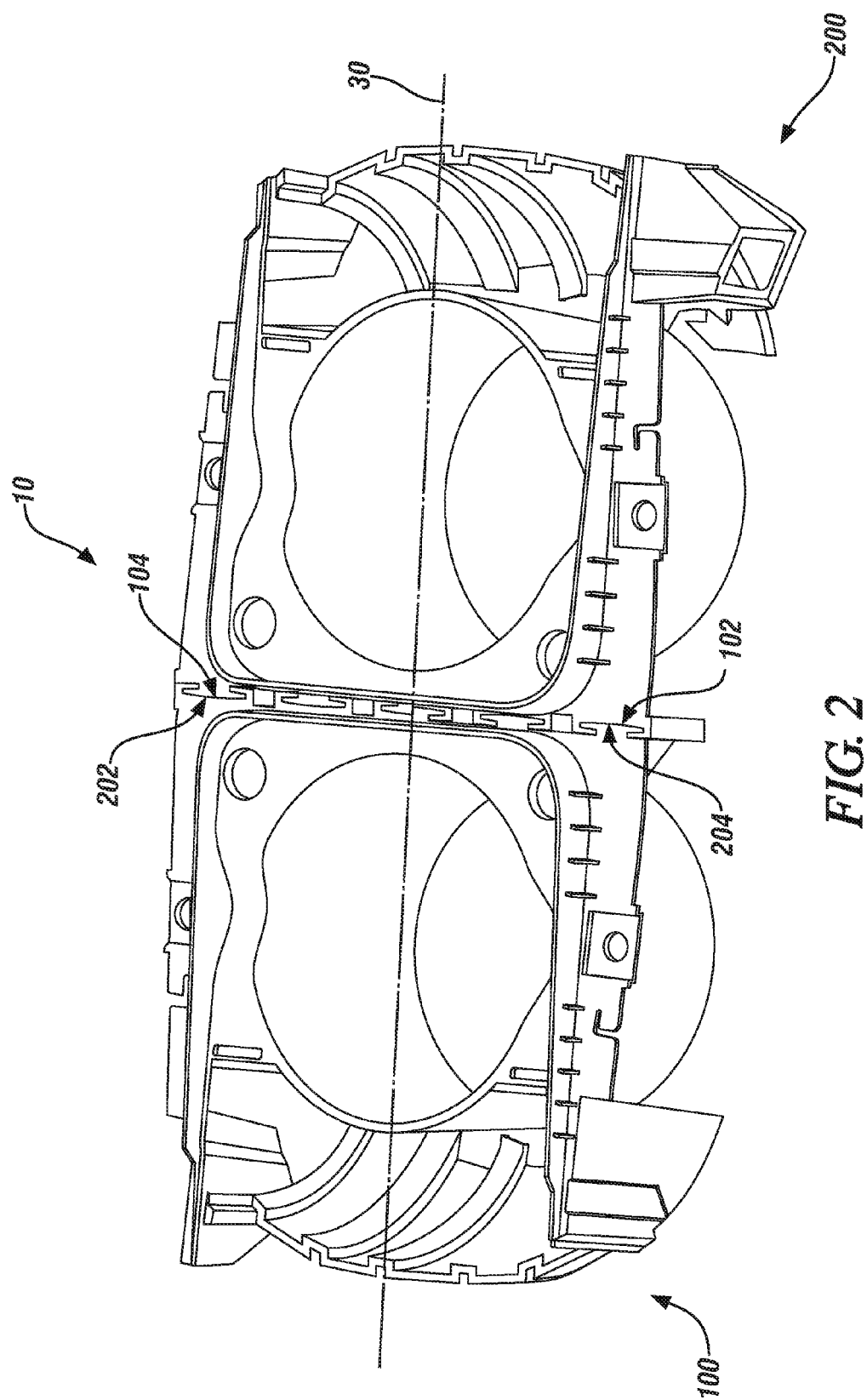
FIG. 2 is a perspective view of the elastically averaged alignment system shown in FIG. 1 and after assembly.
Figure 3:
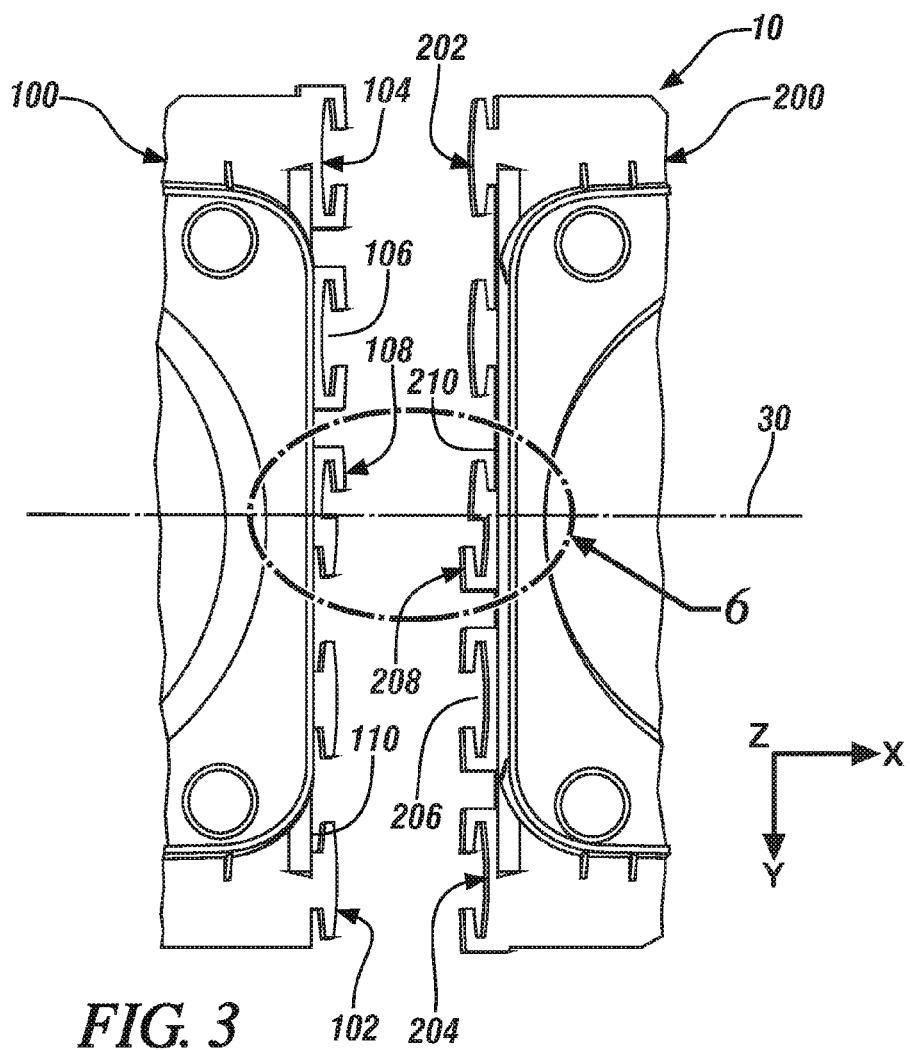
FIG. 3 is an enlarged view of a portion of the elastically averaged alignment system shown in FIG. 1 and taken at section 3.

FIGS. 1-3 illustrate an exemplary elastically averaged alignment system 10 that generally includes a first component 100 to be mated to a second component 200. First component 100 and second component 200 each respectively include elastically deformable alignment members 102, 202, receiving members 104, 204 defining a receiving aperture 106, 206, and center alignment members 108 and 208. As shown in FIG. 3, each alignment member 102 of first component 100 is oriented for engagement with a corresponding receiving member 204 of second component 200. Similarly, each alignment member 202 of second component 200 is oriented for engage with a corresponding receiving member 104 of first component 100. Further, center alignment member 108 of first component 100 is oriented for engagement with corresponding center alignment member 208. Alignment members 102, receiving members 104, and center alignment member 108 are fixedly disposed on or formed integrally with an edge 110 of component 100 for proper alignment and orientation when components 100 and 200 are mated. Similarly, alignment members 202, receiving member 204, and center alignment member 208 are fixedly disposed on or formed integrally with an edge 210 of component 200 for proper alignment and orientation when components 100 and 200 are coupled.

In the exemplary embodiment, first component 100 and second component 200 are substantially similar, modular components such that each component is configured to couple with another of the same component. As shown in FIG. 1, second component 200 is similar to first component 100 and is oriented 180° from that of first component 100 such that first and second components 100, 200 are oriented for mating. Although a certain number of alignment members 102, 202, receiving members 104, 204, and center alignment members 108, 208 are illustrated, components 100 and 200 may have any number and combination of corresponding alignment members 102, 202, receiving members 104, 204, and center alignment members 108, 208. Moreover, although alignment members 102, 202, receiving members 104, 204, and center alignment members 108, 208 are illustrated only along a single edge (e.g., 110 and 210), alignment members 102, 202, receiving members 104, 204, and center alignment members 108, 208 may be positioned at any location on respective components 100, 200 that enables system 10 to function as described herein. For example, the features may be formed on two or three edges of one component. Elastically deformable alignment members 102, 202 are configured and disposed to interferingly, deformably, and matingly engage receiving members 104, 204, as discussed herein in more detail, to precisely align first component 100 with second component 200 in four directions, such as the +/−x-direction and the +/−z-direction of an orthogonal coordinate system, for example, which is herein referred to as four-way alignment.

Figure 4:
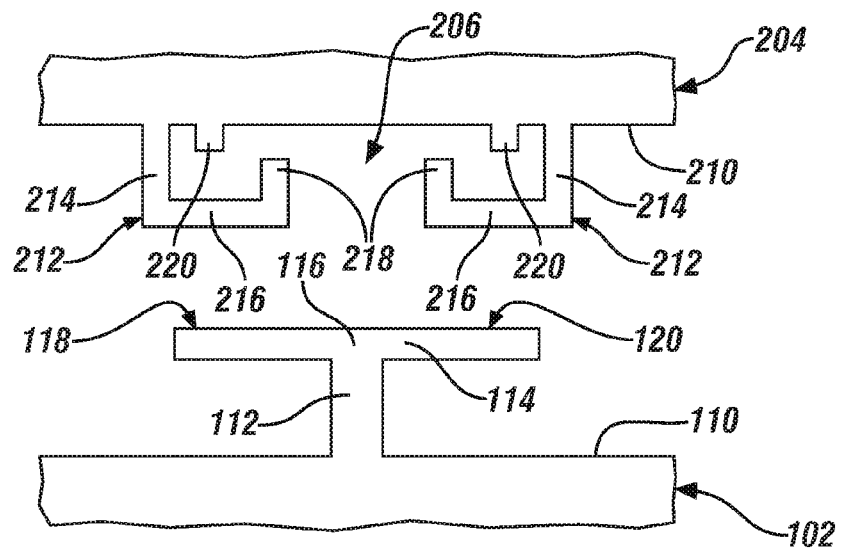
FIG. 4 is an alternate embodiment of a portion of the elastically averaged alignment system shown in FIG. 3.
Figure 5:
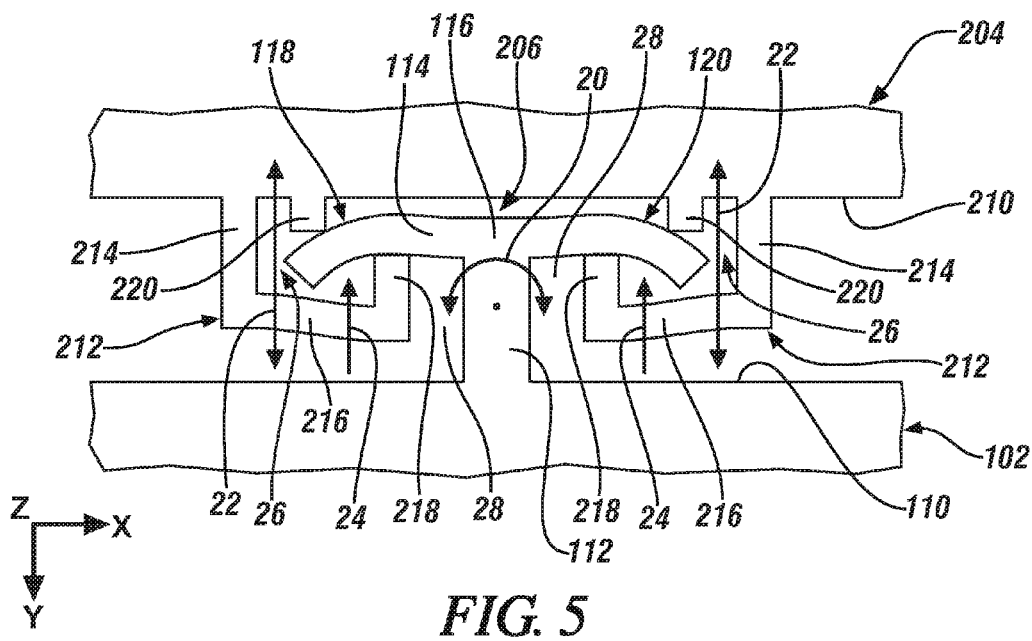
FIG. 5 is an plan view of the portion of the elastically averaged alignment system shown in FIG. 4 and after assembly.

FIGS. 4 and 5 illustrate an alternative embodiment of one alignment member 102 and corresponding receiving member 204 in more detail. However, it should be understood that the following description applies equally to alignment members 202 and corresponding receiving members 104, and similar reference numerals depict like parts in the Figures. In the exemplary embodiment, alignment member 102 includes a base portion 112 extending from edge 110, and a connector portion 114 coupled to base portion 112. In the exemplary embodiment, base portion 112 is coupled at a midpoint 116 of connector portion 114 between two endpoints 118 and 120 such that alignment member 102 forms a T-shape. However, base portion 112 may be coupled to connector portion 114 at another location. In the exemplary embodiment, first component 100 is fabricated from an elastically deformable material such as plastic. However, first component 100 may be fabricated from any suitable material that enables system 10 to function as described herein. Moreover, alignment members 102, receiving members 104, and/or center alignment members 108 may be fabricated from a different material than the remainder of first component 100.

Receiving member 204 includes a pair of cantilevers 212 generally defining receiving aperture 206. Each cantilever 212 includes a support portion 214 extending from edge 210, an arm portion 216 coupled to support portion 214, and a finger portion 218 coupled to arm portion 216 and generally extending towards edge 210. Second component 200 also includes a pair of alignment tabs 220 extending from edge 210 into receiving aperture 206. In the exemplary embodiment, second component 200 may be fabricated from elastically deformable material such as plastic. However, second component 200 may be fabricated from any suitable material that enables system 10 to function as described herein. Moreover, alignment members 202, receiving members 204, and/or center alignment members 208 (not shown in FIGS. 4 and 5) may be fabricated from a different material than the remainder of second component 200.

Returning to FIGS. 1 and 2, while not being limited to any particular structure, first component 100 and second component 200 may each be formed as a cup holder, which may be a supporting substructure that is part of, or is attached to, the vehicle. However, first and second components 100, 200 may be made to have any suitable shape for a desired purpose.

To provide an arrangement where elastically deformable alignment member 102 is configured and disposed to interferingly, deformably and matingly engage receiving member 204, the size or cross-section of receiving aperture 206 is smaller than the size or cross-section of alignment member 102, which necessarily creates a purposeful interference fit between the elastically deformable alignment member 102 and receiving member 204. Further, receiving member 204 may include chamfer (not shown) along its edges to facilitate insertion of alignment member 102. As such, when inserted into receiving member 204, portions of the elastically deformable alignment member 102 elastically deform to an elastically averaged final configuration that aligns alignment member 102 with the receiving member 204 in four planar orthogonal directions (the +/− x-direction and the +/−z-direction). Additionally, connector portion 114 may rotate about base portion 112 as shown by arrow 20 such that ends 118, 120 are generally movable in a direction shown by arrows 22 to facilitate precisely aligning edges 110 and 210.

In the exemplary embodiment, when alignment member 102 is inserted, portions of the elastically deformable receiving member 204 also elastically deform to an elastically averaged final configuration that aligns alignment member 102 with receiving member 204 in the four planar orthogonal directions. Further still, when alignment member 102 is inserted into receiving member 204, portions of the elastically deformable alignment tabs 220 elastically deform to an elastically averaged final configuration that aligns alignment member 102 with receiving member 204 in four planar orthogonal directions to facilitate aligning edges 110 and 210 of respective components 100, 200.

As shown in FIG. 5, an interference fit is established between connector portion ends 118, 120 and alignment tabs 220, as well as between connector portion 114 and finger portions 218. When alignment member 102 is inserted into receiving member 204, a spring action of cantilevers 212 forces connector portion 114 toward edge 210 and into contact with alignment tabs 220, as shown by arrows 24. Further, alignment member 102 and receiving member 204 are sized such that a clearance 26 is defined between connector end 118 and support portion 214 and between connector end 120 and opposite support portion 214. Clearance 26 facilitates movement of connector portion 114 within receiving aperture 206 (e.g., rotate about base portion 112) and deform to an elastically averaged final configuration. Similarly, a clearance 28 is defined between each finger portion 218 and base portion 112, which facilitates enabling base portion 112 to twist and/or pivot to an elastically averaged final configuration.

Figure 6:
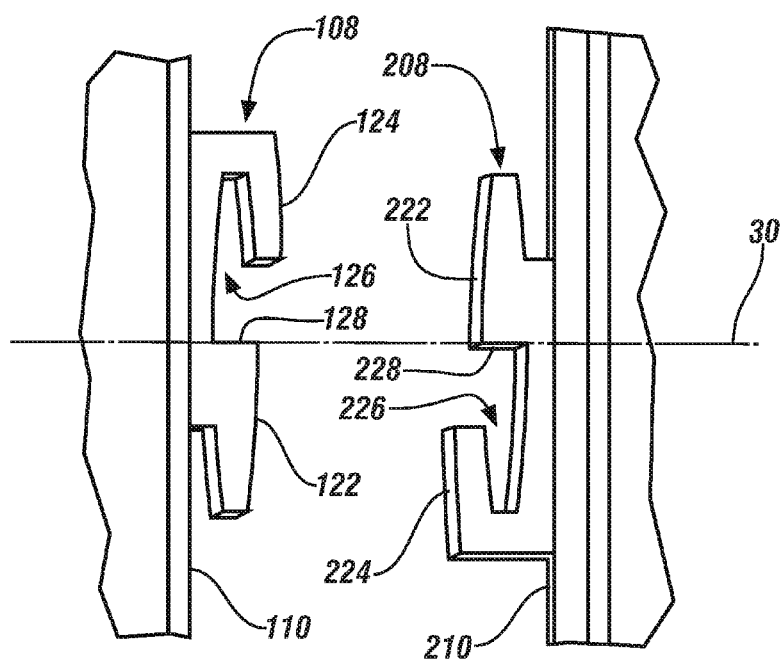
FIG. 6 is an enlarged view of a portion of the elastically averaged alignment system shown in FIG. 3 and taken along section 6.

FIG. 6 illustrates center alignment members 108 and 208 in more detail. Center alignment member 108 extends from edge 110 and includes alignment portion 122 coupled to a receiving portion 124 generally defining a receiving aperture 126. Similarly, center alignment member 208 extends from edge 210 and includes an alignment portion 222 coupled to a receiving portion 224 generally defining a receiving aperture 226. In the exemplary embodiment, center alignment members 108, 208 are fabricated from an elastically deformable material such as plastic. However, center alignment members 108, 208 may be fabricated from any suitable material that enables system 10 to function as described herein. Moreover, although center alignment members 108, 208 are illustrated as being located generally at a midpoint of the length of respective edges 110, 210, center alignment member 108, 208 may be formed at any location along the length of edges 110, 210. For example, alignment member 108 may be located at each end of edge 110.

To provide an arrangement where elastically deformable alignment portions 122, 222 are configured and disposed to interferingly, deformably and matingly engage respective corresponding receiving portions 224, 124, the size or cross-section of receiving apertures 126, 226 are smaller than the size or cross-section of alignment portions 122, 222, which necessarily creates a purposeful interference fit between the elastically deformable alignment portions 122, 222 and receiving portions 124, 224. Further, center alignment members 108, 208 may include a chamfer (not shown) along their edges to facilitate insertion of the opposed alignment member. As such, when inserted into receiving portion 124, 224, portions of the elastically deformable alignment members 122, 222 elastically deform to an elastically averaged final configuration that aligns center alignment member 108 with the center alignment member 208 in four planar orthogonal directions (the +/−x-direction and the +/−z-direction). Additionally, alignment portion 122 includes a locator surface 128, and alignment portion 222 includes a corresponding locator surface 228. In the exemplary embodiment, locator surfaces 128 and 228 abut against each other to define a centerline 30 of system 10 and to facilitate alignment of first component 100 and second component 200.

Figure 7:
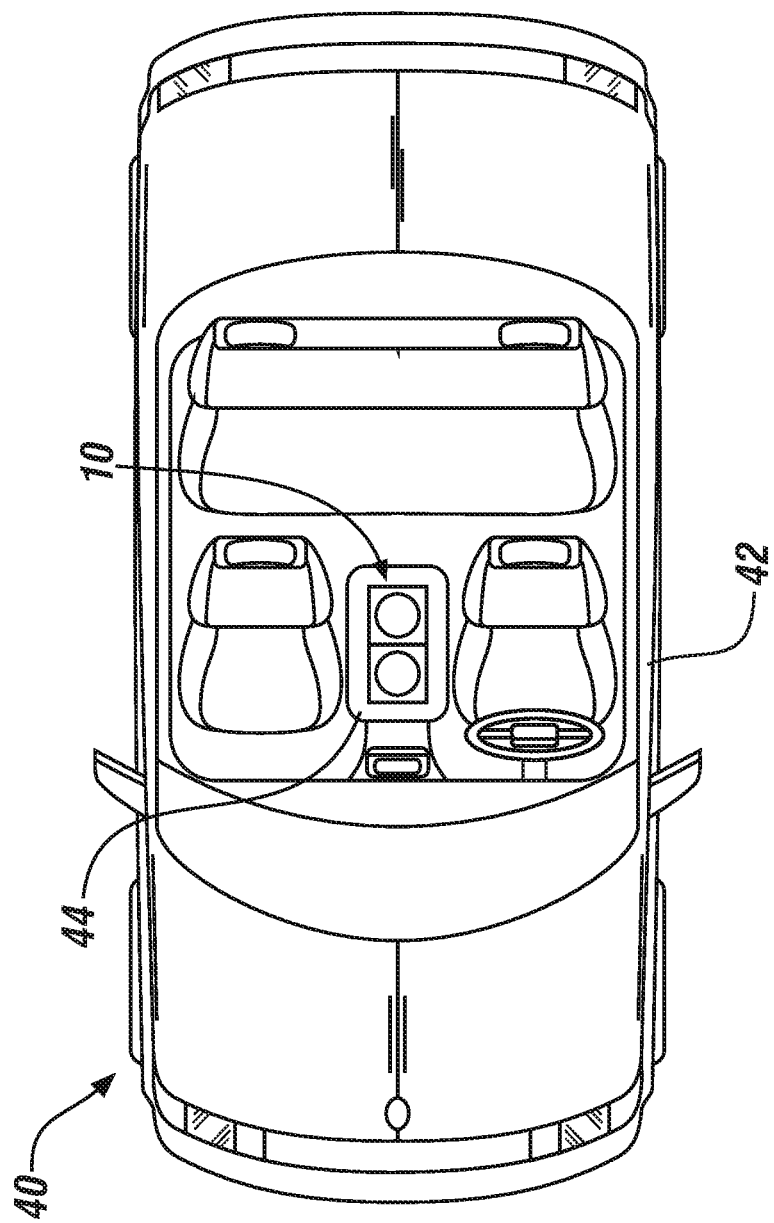
FIG. 7 is a cut-away view of a vehicle that may use the elastically averaged alignment systems shown in FIGS. 1-6.

In view of the foregoing, and with reference now to FIG. 7, it will be appreciated that an embodiment of the invention also includes a vehicle 40 having a body 42 with an elastically averaging alignment system 10 as herein disclosed integrally arranged with the body 42. In the embodiment of FIG. 7, the elastically averaging alignment system 10 is depicted forming at least a portion of a front console 44 of vehicle 40. However, it is contemplated that an elastically averaging alignment system 10 as herein disclosed may be utilized with other features or components of vehicle 40, such as, for example, exterior body trim, interior trim, inserts, bezels, and decorative trim.

An exemplary method of fabricating elastically averaged alignment system 10 includes forming first component 100 with at least one of alignment member 102. Second component 200 is formed with at least one corresponding receiving member 204 that defines receiving aperture 206, which is configured to receive at least a portion of alignment member 102. Alignment member 102 and/or receiving member 204 are formed to be elastically deformable such that when alignment member 102 is inserted into receiving member 204, alignment member 102 and/or receiving member 204 elastically deforms to an elastically averaged final configuration to facilitate aligning first component 100 and second component 200 and/or edges 110, 210 in a desired orientation.

In the exemplary embodiment, alignment member 102 is formed with base portion 112 extending from edge 110, and connector portion 114 coupled to base portion 112. Alignment member 102 may be formed to have a T-shape. Receiving member 204 is formed with cantilevers 212, which partially define receiving aperture 206, and each cantilever 212 is formed with support portion 214 extending from edge 210, arm portion 216 coupled to support portion 214, and finger portion 218 coupled to arm portion. Elastically deformable alignment tabs 220 may be formed extending from edge 210.

In the exemplary embodiment, alignment member 102 and receiving member 204 are formed such that when alignment member 102 is inserted into receiving member 204, clearance 26 is defined between each support portion 214 and end 118, 120 of connector portion 114. Clearance 28 is also defined between each finger portion 218 and base portion 112.

Second component may be formed with at least one alignment member 202, and first component 100 may be formed with at least one corresponding receiving member 104 that defines a receiving aperture 106 configured to receiving at least a portion of alignment member 202. Alignment member 202 and/or receiving member 104 are formed to be elastically deformable such that when alignment member 202 is inserted into receiving member 104, alignment member 202 and/or receiving member 104 elastically deforms to an elastically averaged final configuration to facilitate aligning first and second components 100, 200 and/or edges 110, 210 in a desired orientation.

First component 100 may be formed with center alignment member 108, and second component 200 may be formed with center alignment member 108. Center alignment members 108, 208 are respectively formed with alignment portion 122, 222 coupled to receiving portion 124, 224 extending from edge 110, 210. Alignment portions 122, 222 respectively include locator surfaces 128, 228, and together with respective receiving portions 124, 224, partially define receiving apertures 126, 226 configured to receive one of alignment portions 122, 222. Center alignment members 108 and/or 208 are formed to be elastically deformable such that when center alignment member 108 is coupled to center alignment member 208, center alignment member 108 and/or 208 elastically deforms to an elastically averaged final configuration to facilitate aligning first and second components 100, 200, aligning edges 110, 210, and/or defining centerline 30.

Systems and methods for elastically averaged mating assemblies are described herein. The systems generally include a first component with elastically deformable alignment members and receiving members positioned for engagement with respective corresponding receiving members and alignment members of a second component. The mating of the first and second components is elastically averaged over corresponding pair(s) of elastically deformable alignment members and receiving members to precisely mate the components in a desired orientation. Moreover, the systems include features such as a movable base and connector portion, spring action cantilevers, and elastically deformable alignment tabs. The systems may additionally include corresponding center alignment members to engage each other and define a centerline of the system, and the components may be made modular for coupling to each other based on component orientation. Accordingly, the features described herein facilitate tunable elastically averaged mating systems that facilitate precise alignment of two or more components.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically averaged alignment system comprising:
   a first component comprising an alignment member, the alignment member comprising a base portion extending from an edge of the first component, and a connector portion coupled to the base portion;
   a second component comprising a receiving member, the receiving member comprising a pair of cantilever members extending from an edge of the second component and defining a receiving aperture configured to receive at least a portion of the alignment member to couple the first component and the second component; and
   at least one alignment tab extending from the second component edge into the receiving aperture, wherein the alignment tab is an elastically deformable material such that when the alignment member is inserted into the receiving aperture, the at least one alignment tab elastically deforms to an elastically averaged final configuration to facilitate aligning the first component edge and the second component edge,
   wherein the alignment member is an elastically deformable material such that when the alignment member is inserted into the receiving aperture, the alignment member elastically deforms to an elastically averaged final configuration to facilitate aligning the first component edge relative to the second component edge.

2. The system of claim 1, wherein the alignment member is T-shaped.

3. The system of claim 1, wherein the cantilever members each comprise a support portion extending from the second component edge, an arm portion coupled to the support portion, and a finger portion coupled to the arm portion.

4. The system of claim 3, wherein when the alignment member is inserted into the receiving aperture, a clearance is defined between each of the support portions and an end of the connector portion.

5. The system of claim 3, wherein when the alignment member is inserted into the receiving aperture, a clearance is defined between each of the finger portions and the base portion.

6. The system of claim 1, further comprising a first center alignment member extending from the first component edge, and a second center alignment member extending from the second component edge, each of the first and second center alignment members comprising an alignment portion coupled to a receiving portion that defines a second receiving aperture, wherein the alignment member of each the center alignment member is configured for insertion into the second receiving aperture of the other the center alignment member to facilitate aligning the first component edge and the second component edge.

7. The system of claim 1, wherein the first component further comprises a second receiving member and the second component further comprises a second alignment member, the second alignment member elastically deforming to an elastically averaged final configuration when the second alignment member is inserted into the second receiving aperture to facilitate aligning the first component edge and the second component edge.

8. The system of claim 1, wherein at least one of the first component and the second component is a cup holder.

9. A vehicle comprising:
   a body; and
   an elastically averaged alignment system integrally arranged within the body, the elastically averaged alignment system comprising:
   a first component comprising an alignment member, the alignment member comprising a base portion extending from an edge of the first component, and a connector portion coupled to the base portion;
   a second component comprising a receiving member, the receiving member comprising a pair of cantilever members extending from an edge of the second component and defining a receiving aperture configured to receive at least a portion of the alignment member to couple the first component and the second component; and
   at least one alignment tab extending from the second component edge into the receiving aperture, wherein the alignment tab is an elastically deformable material such that when the alignment member is inserted into the receiving aperture, the at least one alignment tab elastically deforms to an elastically averaged final configuration to facilitate aligning the first component edge and the second component edge,
   wherein the alignment member is an elastically deformable material such that when the alignment member is inserted into the receiving aperture, the alignment member elastically deforms to an elastically averaged final configuration to facilitate aligning the first component edge relative to the second component edge.

10. A method of manufacturing an elastically averaged alignment system, the method comprising:
    forming a first component comprising an alignment member, the alignment member comprising a base portion extending from an edge of the first component, and a connector portion coupled to the base portion;
    forming a second component comprising a receiving member, the receiving member comprising a pair of cantilever members extending from an edge of the second component and defining a receiving aperture configured to receive at least a portion of the alignment member to couple the first component and the second component;
    forming the alignment member from an elastically deformable material such that when the alignment member is inserted into the receiving aperture, the alignment member deforms to an elastically averaged final configuration to facilitate aligning the first component edge relative to the second component edge; and
    forming at least one alignment tab extending from the second component edge into the receiving aperture, wherein the alignment tab is an elastically deformable material such that when the alignment member is inserted into the receiving aperture, the at least one alignment tab elastically deforms to an elastically averaged final configuration to facilitate aligning the first component edge and the second component edge.

11. The method of claim 10, wherein the forming the first component comprises forming a first component comprising a T-shaped alignment member, the T-shaped alignment member comprising a base portion extending from the first component edge, and a connector portion coupled to the base portion.

12. The method of claim 10, further comprising forming each of the cantilever members with a support portion extending from the second component edge, an arm portion coupled to the support portion, and a finger portion coupled to the arm portion.

13. The method of claim 12, further comprising forming the alignment member and the receiving member such that when the alignment member is inserted into the receiving member there is a clearance defined between each support portion and an end of the connector portion.

14. The method of claim 12, further comprising forming the alignment member and the receiving member such that when the alignment member is inserted into the receiving member there is a clearance defined between each finger portion and the base portion.

15. The method of claim 10, further comprising forming a first center alignment member extending from the first component edge, and forming a second center alignment member extending from the second component edge, each of the first and second center alignment members comprising an alignment portion coupled to a receiving portion defining a second receiving aperture, wherein the alignment member of each center alignment member is configured for insertion into the second receiving aperture of the other center alignment member to facilitate aligning the first component edge and the second component edge.

16. The method of claim 10, further comprising forming the first component with a second receiving member, and forming the second component with a second alignment member, the second alignment member elastically deforming to an elastically averaged final configuration when the second alignment member is inserted into the second receiving aperture to facilitate aligning the first component edge and second component edge.

17. The method of claim 10, further comprising forming a cup holder in at least one of the first and second components.

* * * * *